Jan. 31, 1928.
F. F. FORSHEE
1,657,465
ELECTRIC HEATING UNIT
Filed March 12, 1926
2 Sheets-Sheet 2
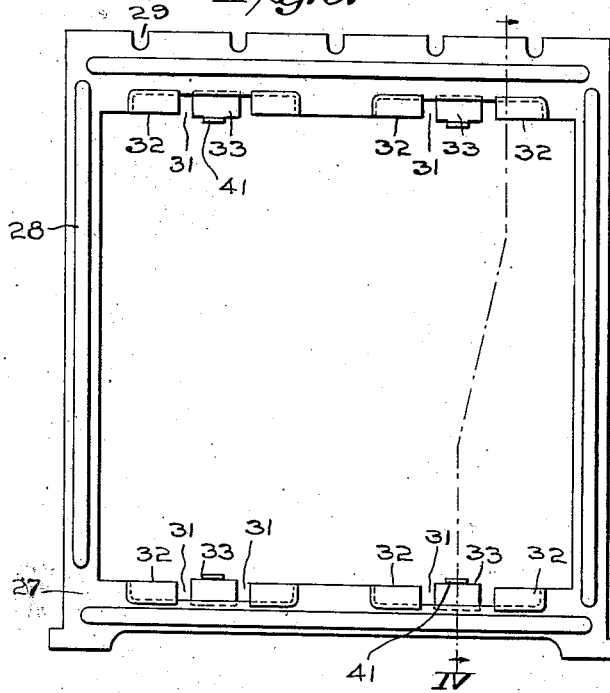
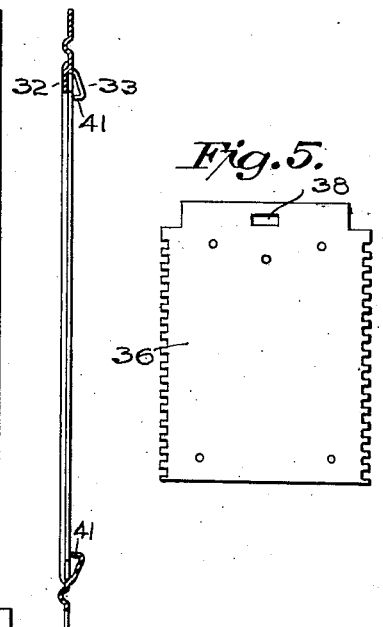
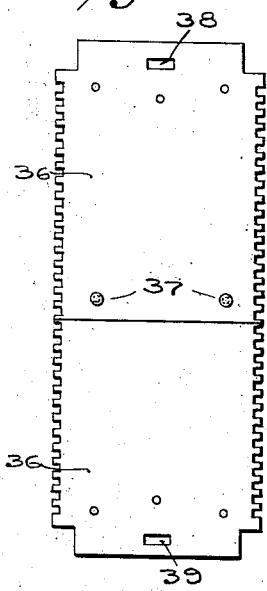
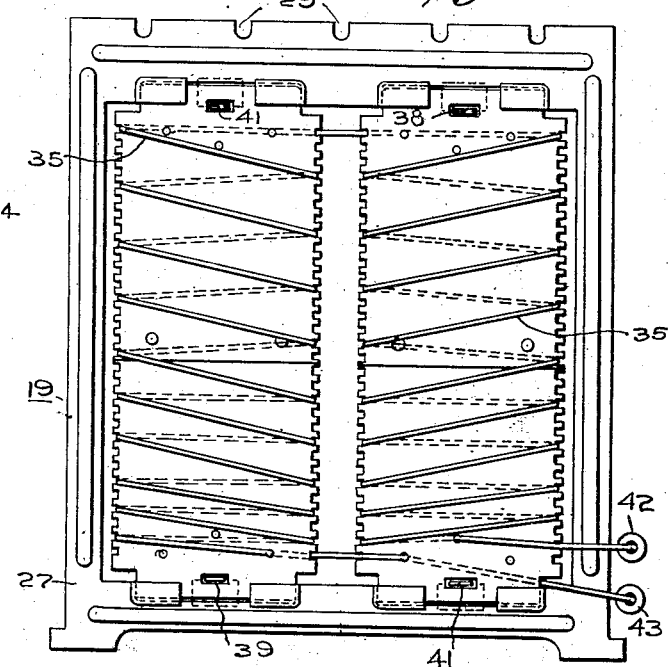
WITNESSES:
R. S. Harrison
H. M. Biebel
INVENTOR
Frank F. Forshee
BY
Wesley G. Carr
ATTORNEY Patented Jan. 31, 1928.

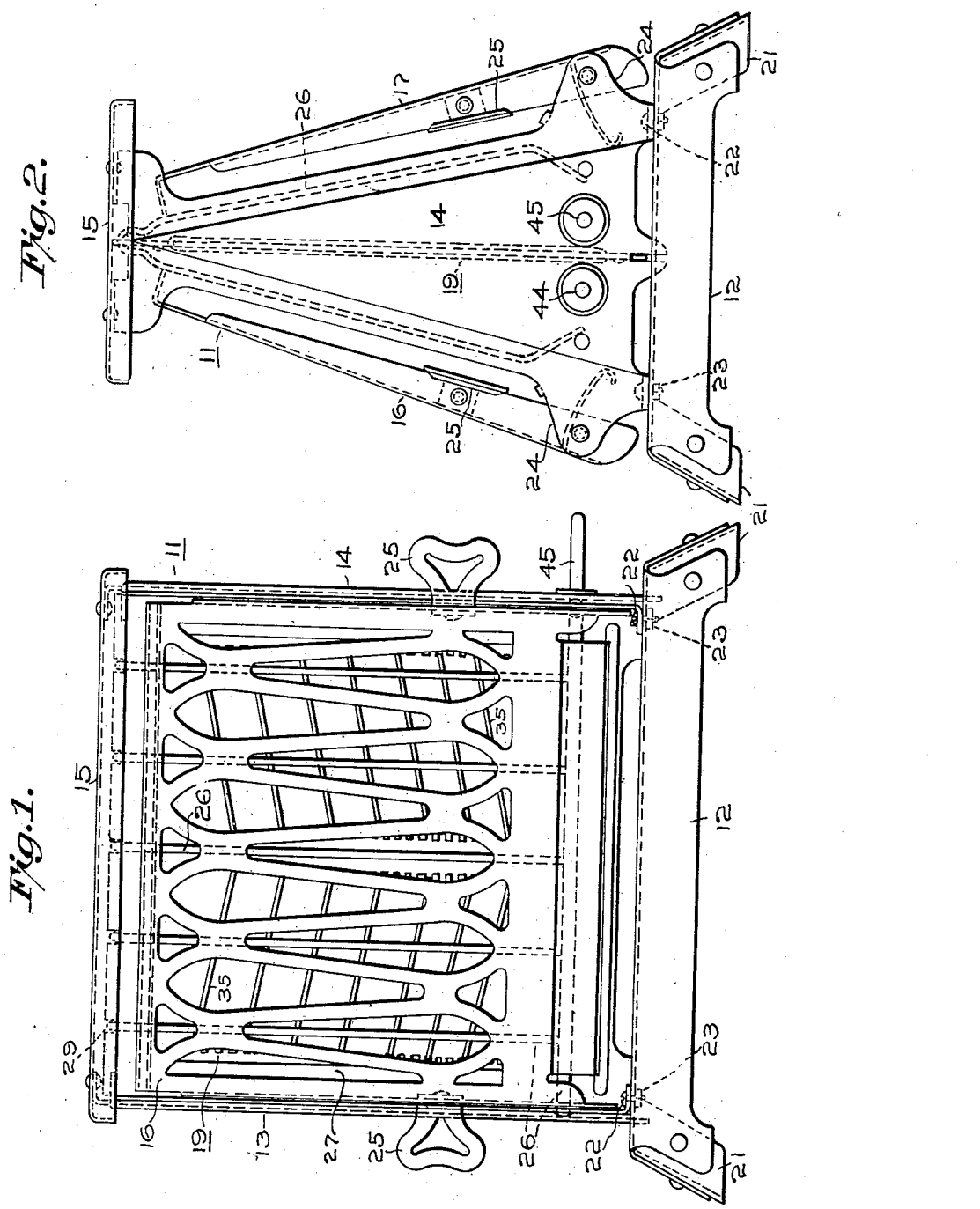

1,657,465

UNITED STATES PATENT OFFICE.

FRANK F. FORSHEE, OF MANSFIELD, OHIO, ASSIGNOR TO WESTINGHOUSE ELECTRIC & MANUFACTURING COMPANY, A CORPORATION OF PENNSYLVANIA.

ELECTRIC HEATING UNIT.

Application filed March 12, 1926. Serial No. 94,197.

My invention relates to electrically-heated devices and particularly to electric heating units.

An object of my invention is to provide a relatively simple, inexpensive and lightweight heating unit that shall comprise a minimum number of parts and that shall be easy to manufacture and assemble.

In practicing my invention, I provide a skeleton metal frame embodying alternatively, oppositely bent lug portions for receiving and holding the edge portions of a resilient resistor-supporting member.

In the drawings,

Figure 1 is a view, in front elevation, of a device embodying my invention.

Fig. 2 is a view, in end elevation thereof.

Fig. 3 is a view, in front elevation, of a skeleton frame embodying my invention.

Fig. 4 is a view, in vertical section therethrough, taken on the line IV—IV of Fig. 3.

Fig. 5 is a view, in front elevation, of a portion of a resistor supporting member.

Fig. 6 is a view, in front elevation, of a complete resistor supporting member, and Fig. 7 is a view, in front elevation, of a complete heating unit embodying my invention.

As the heating unit embodying my invention has been developed initially for use in an electric toaster, I have shown a toaster 11 in Figs. 1 and 2 of the drawings. The toaster comprises a base 12, side frames 13 and 14, a top portion 15, two movable tray members 16 and 17 and a heating unit 19.

The base 12 comprises a flat top portion and integral and angularly depending flange portions, feet or supporting members 21 of a suitable heating and electric-insulating material being secured to the end portions of the respective flanges of the base member 12.

The side frames 13 and 14 are secured against the top of the base by suitable machine screws 22 and co-operating nuts 23. The top or cover member 15 may be riveted to turned-in portions of the side frames, or it may be secured to the frames in any other desired manner.

The side frames are provided with integral extensions at each side thereof near the bottom, in which the trays 16 and 17 are pivotally mounted for turning movement relatively to the frames and the toaster in general. Handle members 25 are provided at each side portion of each of the trays to permit actuation of the same.

A cage member 26 is located within the toaster and comprises a plurality of wires bent to substantially V-shape, the acute angle-portion thereof being located immediately below the top plate 15.

The heating unit 19 comprises a frame member 27 of substantially square form that is made of punched sheet metal, the metal being relatively thin. In order to strengthen the skeleton frame 27, corrugations 28 are provided in each of the four portions of the frame 27. The upper portion of the frame 27 is provided with a plurality of notches or recesses 29 which are adapted to be operatively engaged by the respective wires of the cage 26, hereinbefore described, whereby not only the cage but also the top portion of the heating unit 19, are held in their proper operative positions.

The inner edges of the upper and the lower portions of the frame 27 have notches 31 cut therein and lug portions 32 and 33 are bent therefrom laterally of the plane of the frame portion. The general shape and location of the respective lugs 32 and 33 are shown more particularly in Figs. 3 and 4 of the drawing.

A heating element comprising a resistor-supporting member 34 and a resistor member 35 wound thereon, comprises a pair of relatively small sheets 36 of mica, the side edges of which are provided with a plurality of notches or recesses within which resistor member 35 may be located in order that it may be held in a predetermined position on the sheet 34. The two half portions 36 of mica may be riveted together by small rivets 37, as shown more particularly in Fig. 6 of the drawing. Openings 38 and 39 are punched in the end portions of the assembled resistor supporting member 34, and the width of the end portions is made less than the width of the other portions.

The end portions of the resistor-supporting member 34 are adapted to fit within the sockets constituted by the alternately, oppositely-bent lug portions 32 and 33, and in placing these resistor-supporting members in their proper operative position, one end portion is first placed within or between these spaced lug portions. The member 34 is then bent to arcuate form until the other end portion will slip within the socket constituted by the lug portions 32 and 33 on the opposed part of the frame 27. The member 34 will straighten out because of its resiliency and the position thereof in the frame 27 will be substantially that shown in Fig. 7 of the drawing.

The lug portions 33 are severally provided with a short integral extension 41, as shown more particularly in Fig. 4 of the drawing, which extensions fit within the openings 38 and 39, respectively, of the resistor-supporting plate 34. The member 34 is prevented from movement longitudinally of its own plane by its interfitting with the members 41, as well as by reason of the fact that it is located within the socket formed by the bent-out lug portions 32 and 33. The ends of the resistor member 35 are brought to suitable terminal members 42 and 43 which are connected to terminal pins 44 and 45 in any manner well known in the art.

While I have illustrated and described a vertical table toaster as comprising the device embodying my invention, it is obvious that its use is not limited thereto and I have therefore not described or illustrated the other portions of the toaster except in so far as it may be necessary to illustrate the use of the heating unit constituting my invention. The device embodying my invention thus provides a relatively lightweight, open heating unit that may be easily and inexpensively manufactured and that will have a relatively small heat storage capacity only, a characteristic which is highly desirable in a great many electrically-heated devices, particularly table toasters.

Various modifications may be made in the device embodying my invention without departing from the spirit and scope thereof and I desire that only such limitations shall be imposed as are indicated in the appended claims.

I claim as my invention:

1. An electric heating unit comprising a peripheral frame, having alternate integral portions thereof pressed laterally out of the plane of said frame in opposite directions, and an electric heating element having its edge portions only in engagement with the frame and located between the alternately pressed-out portions.

2. An electric heating unit comprising a peripheral frame embodying alternately laterally bent lug portions, and an electric heating element having edge portions thereof located between the bent lug portions, one of said lug portions having a part interfitting with the heating element.

3. An electric heating unit comprising a peripheral frame embodying lugs bent alternately oppositely and laterally out of the plane of the frame, in two opposed sides, a resilient resistor-supporting member extending between the lugs in the two opposed sides, placed in proper operative position therein by initial bending thereof and held therein by a portion of a lug interfitting with the supporting member, and a resistor wound on the supporting member.

4. An electric heating unit comprising a metal skeleton frame having corrugated portions extending longitudinally of the frame and having also integral lug portions alternately bent out of the plane of the frame, a resilient resistor-supporting member, of electric-insulating material, extending between two opposed sides of the frame and placed in operative position between the alternately-oppositely bent lugs by initial bending thereof, one of said lugs being provided with a portion interfitting with said resistor-supporting member.

In testimony whereof, I have hereunto subscribed my name this 26th day of Feb. 1926.

FRANK F. FORSHEE.